US007235771B2

(12) United States Patent
Pain et al.

(10) Patent No.: US 7,235,771 B2
(45) Date of Patent: Jun. 26, 2007

(54) INCREASING THE DYNAMIC RANGE OF CMOS PHOTODIODE IMAGERS

(75) Inventors: Bedabrata Pain, Los Angeles, CA (US); Thomas J. Cunningham, Pasadena, CA (US); Bruce R. Hancock, Altadena, CA (US)

(73) Assignee: California Institute of Technology, Malibu, CA (US)

( * ) Notice: Subject to any disclaimer, the term of this patent is extended or adjusted under 35 U.S.C. 154(b) by 149 days.

(21) Appl. No.: 11/191,603

(22) Filed: Jul. 27, 2005

(65) Prior Publication Data

US 2006/0023092 A1    Feb. 2, 2006

Related U.S. Application Data

(60) Provisional application No. 60/593,029, filed on Jul. 29, 2004.

(51) Int. Cl.
 *H01L 27/00* (2006.01)
(52) U.S. Cl. .................. 250/208.1; 250/214 R
(58) Field of Classification Search ............. 250/208.1, 250/214 R, 214.1, 214 LS; 257/290–294, 257/440
 See application file for complete search history.

(56) References Cited

U.S. PATENT DOCUMENTS 6,211,510 B1    4/2001  Merrill et al. ........... 250/208.1
6,424,375 B1    7/2002  Fowler ...................... 348/241
6,861,635 B1*   3/2005  Phan ......................... 250/208.1
2002/0182788 A1 12/2002 Pain et al. ................ 438/152
2004/0169740 A1 9/2004  Pain et al. ............... 348/229.1
2005/0001918 A1 1/2005  Berezin et al. ............ 348/308

OTHER PUBLICATIONS

Written Opinion of The International Searching Authority for the Corresponding PCT Application No. PCT/US2005/026772, issued Nov. 24, 2005 (6 pages).
Fowler, B., et al., "Low Noise Readout using Active Reset for CMOS APS," *Sensors and camera systems for scientific, industrial and digital photography applications; Proceedings of the Conference*, pp. 126-135 (Jan. 24-26, 2000).

\* cited by examiner

*Primary Examiner*—Que T. Le
(74) *Attorney, Agent, or Firm*—Ladas & Parry LLP (57) ABSTRACT

A multiple-step reset process and circuit for resetting a voltage stored on a photodiode of an imaging device. A first stage of the reset occurs while a source and a drain of a pixel source-follower transistor are held at ground potential and the photodiode and a gate of the pixel source-follower transistor are charged to an initial reset voltage having potential less that of a supply voltage. A second stage of the reset occurs after the initial reset voltage is stored on the photodiode and the gate of the pixel source-follower transistor and the source and drain voltages of the pixel source-follower transistor are released from ground potential thereby allowing the source and drain voltages of the pixel source-follower transistor to assume ordinary values above ground potential and resulting in a capacitive feed-through effect that increases the voltage on the photodiode to a value greater than the initial reset voltage.

12 Claims, 4 Drawing Sheets

INCREASING THE DYNAMIC RANGE OF CMOS PHOTODIODE IMAGERS

CROSS REFERENCE TO RELATED APPLICATIONS

This application is related to and claims the benefit of U.S. Provisional Patent Application No. 60/593,029 filed Jul. 29, 2004, the disclosure of which is hereby incorporated herein by reference.

This application is also related to U.S. Patent Application Publication No. 2004/0169740 the disclosure of which is also hereby incorporated herein by reference.

STATEMENT REGARDING FEDERALLY SPONSORED RESEARCH OR DEVELOPMENT

The invention described herein was made in the performance of work under a NASA contract, and is subject to the provisions of Public Law 96-517 (35 USC 202) in which the Contractor has elected to retain title.

TECHNICAL FIELD

This invention related to improvements in the dynamic range of CMOS imagers that have a photodiode and typically three or more transistors per pixel.

BACKGROUND OF THE INVENTION

CMOS imagers are electronic camera or imaging chips implemented in CMOS (complementary metal/oxide/silicon) technology, the technology presently used to make a large fraction of analog electronic circuits, as well as virtually all digital electronics. The CMOS process uses n-channel and p-channel field-effect transistors, as well as typically diodes, resistors and capacitors.

A CMOS imager contains a light-sensitive area where an optical image is focused. The image is converted into an electrical signal at the light-sensitive area. The CMOS imager also typically includes surrounding support electronics that readout the electrical signal, producing an analog or digital video output signal.

The light sensitive area is divided into a two-dimensional array of picture elements, or pixels. Each pixel in the array converts the light that falls on that pixel over an integration time period into a single signal voltage that can be read out by the support electronics.

Figure 1:
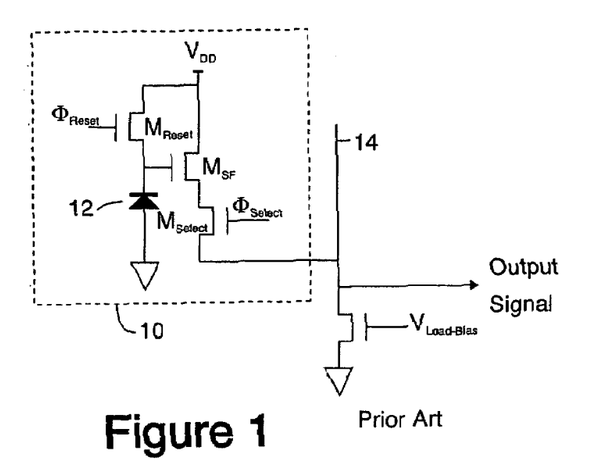
FIG. 1 is a schematic of a conventional three-transistor photodiode pixel and the circuitry common to a column conductor.

A schematic of a commonly used prior art photodiode pixel 10 is shown in FIG. 1. Of course, those skilled in the art recognize that a conventional imager may well have millions of pixels 10 in a given imager arranged in a two dimensional array of pixels 10 and that only a single pixel is represented by FIG. 1. The pixels 10 become sensitive to light impinging them during an integration time period when electrons are bled off a capacitor inherently associated with a photosensitive diode 12.

Immediately prior to the beginning of the integration time period the photo diode 12 is reset. When $\Phi_{Reset}$ goes high the reset transistor $M_{Reset}$ is turned on draining away any accumulated charge in the photodiode 12 thereby reverse biasing the photodiode 12 with the voltage $V_{DD}$. The reset transistor $M_{Reset}$ is then turned off again when $\Phi_{Reset}$ goes low, isolating the photodiode 12 and initially leaving a voltage equal to $V_{DD}$ initially stored on the photodiode's internal capacitance. The integration time-period then begins and light incident on the pixel 10 generates an internal current in the photodiode 12, tending to discharge the capacitively stored voltage towards ground. The amount of discharge in a fixed amount of time (the integration time period) is proportional to the intensity of light incident on the pixel 10.

Then when $\Phi_{Select}$ goes high the pixel voltage is read out by turning on the select transistor $M_{Select}$. This allows the column current source to draw current through the source-follower transistor $M_{SF}$, biasing it, while simultaneously allowing source-follower transistor $M_{SF}$ to drive the column bus or line 14. The source-follower transistor $M_{SF}$ acts like a single-transistor buffer amplifier and it causes the column bus 14 voltage to follow the photodiode 12 voltage (minus a fixed offset drop) allowing a signal representative of the photodiode voltage to be sampled on line 14.

A key figure of merit of a CMOS imager is its dynamic range, which is the range of signals which the imager can faithfully read out. It is usually expressed as a ratio of the largest readable signal to the smallest readable signal. The smallest readable signal is determined by the noise floor of the imager. This invention does not address the noise directly, so the noise floor need not be discussed further in any particular detail. However, noise reduction is discussed in passing in connection with a second embodiment which has certain noise reduction features and one purpose of the second embodiment is to demonstrate that the techniques disclosed herein are compatible with noise reduction techniques.

The largest readable signal is determined by the maximum signal swing that can be read out. The dynamic range is maximized by making the high end voltage as high as possible and the low end voltage as low as possible.

In a photodiode imager, the low end of this range is determined by the offset of the source-follower and its relation to other downstream electronics. Again the low end of the swing is not addressed by this disclosure and so again will not be discussed further.

The high end of the voltage swing is determined by how high one can set the photodiodes' initial reset voltage. This innovation is intended to increase the dynamic range by increasing the magnitude of this reset voltage.

The complementary nature of CMOS means that both n-channel and p-channel transistors are ordinarily available to the designer, and both types are used in some parts of the imager, such as in associated logic circuits. However, in most practical designs the pixel size is quite limited, usually being on the order of 10 μm for a typical imager. There is a minimum separation normally required between n-channel and p-channel transistors, and the amount of required separation normally means that one cannot mix transistor types within a pixel and keep the size of the imager small. Therefore all of the transistors in the pixel are typically of the same conductivity type, usually n-type (which is also called n-channel).

The three transistors shown in FIG. 1 are all therefore typically all of the same conductivity type and in modern circuits this means that they are preferably all n-channel transistors. The reset drive voltage is the positive supply voltage, $V_{DD}$. A problem comes about because using an n-channel transistor (or generically a reset switch or transistor having the same conductivity type as the other transistors in the imager) as the reset switch limits the maximum diode reset voltage. In order for an n-channel transistor to be on, the gate voltage must be at least one threshold voltage (called $V_T$) more positive than the source voltage of the transistor. Alternatively, one can say that the source must be more negative than the gate by at least $V_T$. The same issue would arise for a p-channel imager, but in that case the polarities would be reverse.

While it is possible to overdrive the gate voltage of the reset transistor by certain means, this can damage the reset transistor, resulting in greatly reduced reliability. Therefore, in a standard configuration, the maximum gate voltage is the positive supply voltage $V_{DD}$ (usually either 5 volts or 3.3 volts, depending on the CMOS process used).

If the gate is held at $V_{DD}$ and source must be must be more negative than the gate by at least $V_T$, then the maximum source voltage is $V_{DD}-V_T$ for the transistor to remain on. If the source rises above this voltage then the transistor will tend to turn off. This effect limits the maximum reset voltage of the photodiode to $V_{DD}-V_T$. If the photodiode voltage is initially at ground and $\Phi_{Reset}$ goes high, then $M_{Reset}$ will turn on and current will flow through it pulling the photodiode voltage up toward $V_{DD}$. However, as the photodiode voltage approaches $V_{DD}-V_T$, the gate-source voltage of the reset transistor $M_{Reset}$ approaches the threshold and turns itself off, preventing its source voltage (which is the photodiode reset voltage on the cathode of photodiode 12) from increasing any further.

To be more precise, the transistor $M_{Reset}$ does not abruptly shut off, but instead goes into subthreshold operation where the current decreases exponentially with increasing source voltage. This will allow the photodiode voltage to continue to increase slightly, but it does so logarithmically with time. For a practical reset time of tens of microseconds, the diode voltage can only climb a few millivolts above the cutoff $V_{DD}-V_T$. Even if the reset were continued for hours the diode voltage will only be raised by tens of millivolts above this limit.

For example, in a 3.3 V CMOS process, the threshold voltage $V_T$ is normally about one volt, but it is increased even further by the so-called body effect when its source is raised above ground. Let us therefore use a figure of 1.3 volts for the threshold voltage $V_T$. The maximum photodiode reset voltage is then only 3.3 V–1.3 V=2.0 V.

The lowest value of the photodiode voltage that can be read out is limited by the other electronics, and may typically be about one volt. Therefore the maximum photodiode signal swing is perhaps only from 2 volts to 1 volt, or only a range of 1 volt of the 3.3 volt supply voltage $V_{DD}$. The situation is only slightly better for 5V CMOS processes, and the trend in CMOS development is, if anything, towards lower supply voltages.

The presently disclosed technology is intended to circumvent the problem described above and allow the photodiode 12 to be reset to an initial reset voltage greater than $V_{DD}-V_T$, without having to resort to either overdriving the reset transistor gate or replacing the n-channel reset transistor with a p-channel one.

BRIEF DESCRIPTION OF THE PRESENT INVENTION

The disclosed invention uses a capacitive "kick-up" or so-called "bootstrapping" effect in a two step reset, in order to increase reset voltage of a photodiode above its ordinary reset voltage.

In one aspect the present invention provides a multiple-step reset process for resetting a voltage stored on a photodiode prior to an integration time period, the process including: a first stage which occurs while a source and a drain of a pixel source-follower transistor are held at ground potential and including charging the photodiode and a gate of the pixel source-follower transistor to an initial reset voltage having potential less that of a supply voltage; and a second stage which occurs after the initial reset voltage is stored on the photodiode and the gate of the pixel source-follower transistor and including releasing the source and drain voltages of the pixel source-follower transistor from ground potential and allowing the source and drain voltages of the pixel source-follower transistor to assume ordinary values above ground potential thereby resulting in a capacitive feed-through effect that increases the voltage on the photodiode to a value greater than the initial reset voltage.

In another aspect the present invention provides an imager circuit having a plurality pixels, each pixel including: (i) a photodiode, (ii) a reset transistor for selecting coupling the photodiode to an initial reset voltage, and (iii) a source-follower transistor having a gate coupled to the photodiode and having a first electrode coupled to a bus which is switchable between a ground potential and a supply voltage potential. The imager circuit also includes at least one kick up circuit for increasing the voltage stored on photodiodes in pixels by switching the voltage on said bus.

BRIEF DESCRIPTION OF THE DRAWINGS

Preferred embodiments of the invention will now be described with reference to the following drawings wherein common reference numerals are used throughout the drawings to represent identical or similarly functioning elements and devices.

DETAILED DESCRIPTION OF PREFERRED EMBODIMENTS OF THE PRESENT INVENTION

A First Embodiment

Figure 2:
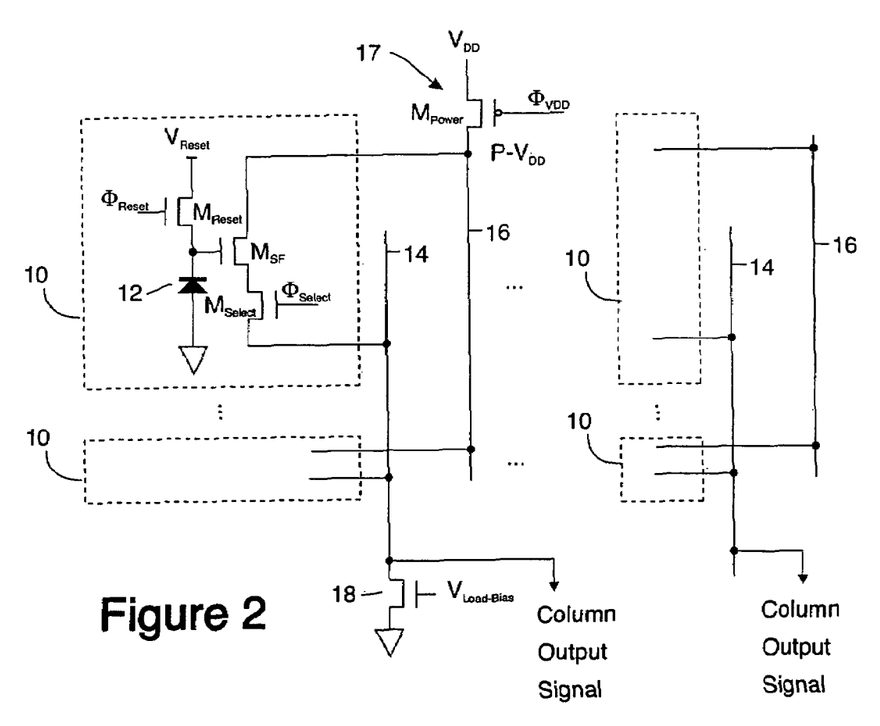
FIG. 2 is a schematic of modified pixel illustrating the present invention for increasing the maximum diode voltage and thereby increasing the dynamic range of a photodiode pixel.

A modified pixel 10 used to implement the presently disclosed technology is shown in FIG. 2, along with the modifications in the column-based biasing circuitry. In FIG. 2, only four pixels 10 are represented, and only one of those four pixels is shown in detail since all pixels would preferably be identical to one another. Each pixel 10 is modified by having the reset voltage, $V_{Reset}$, brought out over a separate line 16 rather than connecting it directly to $V_{DD}$ as done in the prior art of FIG. 1. This allows the reset voltage $V_{Reset}$ and $V_{DD}$ to be controlled separately. The column circuitry 17 (only one column is shown in detail for ease of illustration) is modified by adding a switch transistor, $M_{Power}$, between $V_{DD}$ and the column power line 16, which supplies a voltage called P-$V_{DD}$ (for Pixel $V_{DD}$). $M_{Power}$ is of opposite conductivity type compared to the three transistors in pixel 10. Since switch transistor $M_{Power}$ is located at the top of the column rather than being inside the pixel 10, and because only one such transistor $M_{Power}$ is needed per column (rather than one per pixel), there is no problem achieving the needed n-channel to p-channel separation between these switch transistors $M_{Power}$ (one for each column) and the pixel transistors in the associated column of pixels. Therefore $M_{Power}$ can be a p-channel transistor while the pixel transistors can be n-channel transistors with little space penalty. Using a p-channel transistor switch $M_{Power}$ allows P-$V_{DD}$ to climb all the way to $V_{DD}$ when $M_{Power}$ is turned on. The $M_{Power}$ transistor is described and shown as being located at the "top" of the column for ease of explanation, it being understood by those skilled in the art that it may be located wherever convenient to do so and thus it does not need to be located at the "top" of the column.

The reset is preferably done in two steps. See also FIG. 3 for a diagram of various voltage occurring in the circuit of FIG. 2 during Reset Stage 1 and Reset Stage 2 as well as during a subsequent Integration Stage when the intensity of the impinging light is measured. The first step or stage (Reset Stage 1) is much like a conventional reset. The reset begins with selecting the pixel by bringing $\Phi_{Select}$ high thereby turning on $M_{Select}$. Next during the first reset stage $\Phi_{VDD}$ goes high which turns the column transistor $M_{Power}$ off (since this transistor is preferably a p-type channel FET and thus responds to negative logic). $\Phi_{Reset}$ is then brought high to $V_{DD}$, turning on reset transistor $M_{Reset}$. This charges the diode 12 up to $V_{Reset}$ ($V_{DD}-V_T$), but it cannot go higher since the reset transistor $M_{Reset}$ will tend to turn itself off, as previously mentioned. $\Phi_{Reset}$ is then returned low (to 0 Volt) turning off the reset transistor $M_{Reset}$ and storing $V_{Reset}$ on the diode 12. In this first step the maximum diode reset voltage is still basically limited to $V_{DD}-V_T$, just as in the conventional pixel of FIG. 1.

However, unlike a conventional imager, the added $M_{Power}$ transistor switch together with the fact that the reset voltage is separate from P-$V_{DD}$ allows the reset to be done with $M_{Power}$ switched off. The reset voltage applied to the photodiode is also connected to the gate of $M_{SF}$ turning it on. Since $M_{Select}$ is also on during stage one of the reset, the column current sink 18 is able to pull the column bus to ground, as well as pulling P-$V_{DD}$ on bus 16 to ground through $M_{Select}$ and $M_{SF}$. Therefore when the first step of the reset is completed and $V_{Reset}$ is stored on the capacitance of the photodiode 12, this occurs with the source and drain of $M_{SF}$ are at ground potential.

Even though the reset voltage in this initial step is limited to being less than $V_{DD}-V_T$, because the source and drain of $M_{SF}$ are both at ground potential the reset voltage is still sufficient to induce considerable channel charge in $M_{SF}$. This implies that there is significant capacitance between the channel of $M_{SF}$ and the gate, which is of course connected to the photodiode 12.

This capacitance in $M_{SF}$ is responsible for the boosting of the voltage on the photodiode 12 in the second stage (Reset Stage 2) of the reset operation. In the second stage, $\Phi_{VDD}$ returns low, powering the drain and source of $M_{SF}$. The column p-channel transistor $M_{Power}$ is switched on, bringing the voltage up on P-$V_{DD}$ and therefore the voltage on the drain of $M_{SF}$ back up to $V_{DD}$. The source of $M_{SF}$ also tends to increase, since the tendency of the source-follower is to drive its source up to one threshold drop below its gate voltage, which is initially the photodiode reset voltage. This brings the channel voltage of $M_{SF}$ up as well.

However, the relatively large channel-to-gate capacitance of $M_{SF}$ described previously means that there is significant capacitive feed-through from channel to gate. Therefore, as the channel voltage in $M_{SF}$ comes up during Reset Stage 2, it tends to kick its gate voltage (and therefore the photodiode 12 voltage) up with it as it rises. Further, as this gate voltage rises due to capacitive feed-through, the source-follower transistor $M_{SF}$ tries to make the source and channel follow this increase as well. This further rise is also fed through, creating positive feedback.

In the end, the reset voltage on photodiode 12 will be "kicked up" from its initial value by this capacitive feed-through effect. The magnitude of the kick-up will depend on the ratio of the photodiode capacitance to the source-follower channel capacitance, as well as on the exact gain of the source-follower. In practice, however, the kick-up can be significant, easily on the order of 1 volt or more, which is enough to kick the final reset voltage from less than $V_{DD}-V_T$ to very near $V_{DD}$, which is the maximum to which it should usually be set without risking transistor damage and reduced reliability. Indeed, the final reset voltage can increase above $V_{DD}$ if the ratio mentioned above is not set properly to control the final reset voltage to $V_{DD}$ or less.

To restate: the reset voltage of photodiode 12 is increased beyond its initial limit by doing a two-stage reset. In, the first stage the photodiode 12 is reset to a voltage that is limited to being less than $V_{DD}-V_T$ as in a conventional pixel. However, this reset voltage is stored on the photodiode 12 while the source and drain of the pixel source-follower transistor $M_{SF}$ are pulled down to ground potential, thereby storing a significant charge in the channel-to-gate capacitance of $M_{SF}$. After the initial reset voltage is isolated from (and stored on) photodiode 12, the second reset occurs, where the source and drain of the source follower transistor $M_{SF}$ are allowed to pop back up to an increased voltage. As the voltage on the source and drain rise, capacitive feed-through results in a capacitive "kick up" that increases the photodiode's reset voltage as well, possibly well above the initial limited reset voltage. Therefore, in the second step the reset voltage can be easily increased well beyond the ordinary limit of $V_{DD}-V_T$.

In an exemplary 3.3V CMOS process, the maximum initial reset voltage at the end of the first stage of reset would still be limited to approximately 2 volts. When $M_{Power}$ is turned back on, however, the drain voltage increases by 3.3V while the source voltage may increase by 1 V. The source-follower channel capacitance can easily be comparable to the diode capacitance, and a typical source-follower gain including the body effect might be 0.8. Using these typical values, it would be possible to kick the reset voltage from the initial value of 2 Volts all the way up to around 3.0 Volts.

This would extend the maximum signal swing from approximately 2 volts–1 volt (a 1 volt range) to approximately 3 volts–1 volt or a 2 volt range. This technique effectively doubles the dynamic range of the imager may making a change which does not increase the number of transistors (three) in an individual pixel 10. This is a huge gain in dynamic range for very little additional complexity in the circuit.

Those skilled in the art will appreciate that a technique has been described for increasing the dynamic range in three-transistor photodiode pixel imagers. The fact that the n-channel reset transistor $M_{Reset}$ turns itself off if the diode voltage raises within a threshold of $V_{DD}$ considerably limits the maximum reset voltage of a prior art imager. The disclosed technology addresses that problem by using a two-step reset process. The first stage of reset has the same limitations as the conventional imager, but it is done while the source and drain of the pixel source-follower transistor are held at ground. In the second stage, after the initial reset voltage is stored on the photodiode 12, the source and drain voltages of the pixel source-follower transistor $M_{SF}$ are allowed to return to their ordinary values. This results in a capacitive feed-through effect that kicks up the photodiode 12 voltage reset voltage to a value that can be considerably greater than the $V_{DD}-V_T$ limit associated with the prior art. This will increase the signal swing and therefore the achievable dynamic range, without having either to overdrive transistors (with a resulting reliability penalty) or resort to using p-channel reset transistors within the pixel (with a resulting space penalty).

Figure 3:
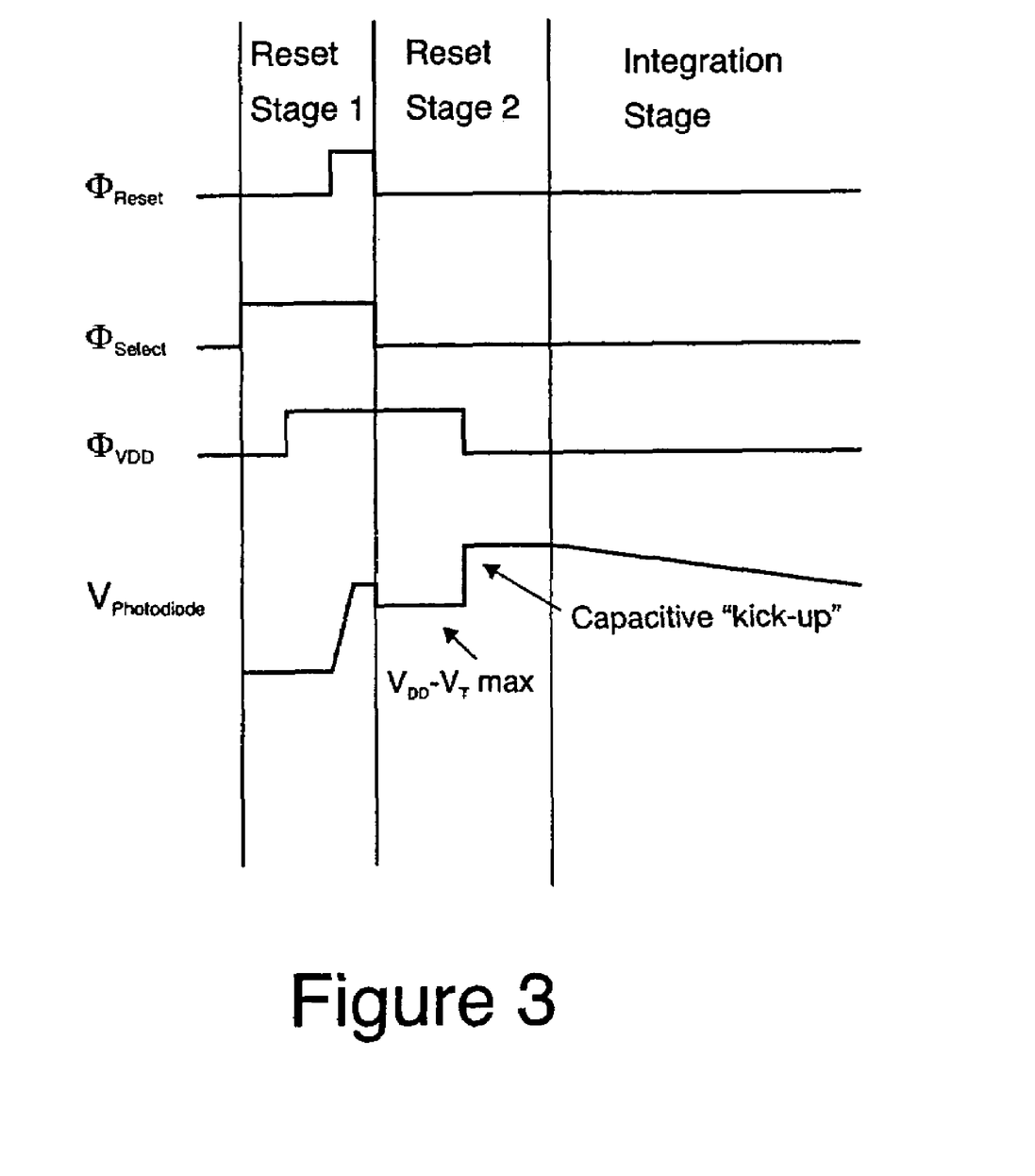
FIG. 3 is a timing diagram for the circuit of FIG. 2.

FIG. 3 depicts the timing diagram for the two stage reset of the pixel of FIG. 2. The reset stages begin with selecting the pixel by bringing ΦSelect high. In the first reset stage, $\Phi_{V_{DD}}$ goes high which turns the column power FET off (since this transistor is preferably a P-channel FET and uses negative logic). $\Phi_{Reset}$ then goes high turning on the reset transistor. The diode voltage rapidly slews up to $V_{DD}$ minus a threshold voltage but it cannot climb above this since the n-channel reset transistor $M_{Reset}$ will then tend to turn itself off. This first reset stage ends when $\Phi_{Reset}$ returns low shutting the reset transistor $M_{Reset}$ off completely. $\Phi_{VDD}$ then returns low, powering the drain and source of the source-follower transistor $M_{SF}$. Capacitive coupling results in a capacitive "kick-up" that can increase the initial diode reset voltage above $V_{DD}-V_T$. $\Phi_{Select}$ is then returned to low, deselecting the pixel, and the pixel is allowed to integrate photo-generated charge, which discharges the photodiode's voltage at a rate proportional to the incident light intensity. At the end of the integration time period the buffered diode voltage is read out, the pixel is again reset as disclosed herein, and the process is repeated A Second Embodiment As mentioned above, the photodiode 12 is periodically reset. Preferably the photodiode 12 is reset to a fixed reset voltage which is the same for every reset. In practice, when the photodiode 12 is isolated at the very beginning of the integration time period the voltage stored on it is the nominal voltage plus or minus some noise voltage. This noise voltage is caused by the integration of Johnson noise onto the capacitance of the photodiode 12.

The ultimate source of this noise is parasitic resistance in the circuit. However, the magnitude of the noise does not depend on the value of the resistance because the RC circuit formed by the parasitic resistance and the photodiode capacitance acts to band limit the noise. If the resistance is higher then more noise per unit frequency results, but it is bandlimited to a lower frequency. If the resistance is lower, then less noise per unit frequency results, but this smaller value is integrated over a wider frequency band.

The overall integral of noise power per unit frequency over frequency is therefore independent of the resistance and is given simply by:

$$V_{noise}=\sqrt{kT/C} \quad (1)$$

where $V_{noise}$ is the rms noise voltage; k is Boltzmann's constant, T is the absolute temperature, and C is the capacitance of the photodiode 12. In charge, the noise is given by:

$$q_{noise}=\sqrt{kTC} \quad (2)$$

This reset noise is therefore known as kTC noise. The kTC noise is the dominant noise source in photodiode imagers. Where the noise floor due to other sources may typically be 5 electrons equivalent rms, the kTC noise may be 50 electrons.

Any means of reducing this kTC noise is therefore potentially important in CMOS imagers.

There are several existing means of reducing kTC noise known in the prior art. The simplest is known as correlated double sampling (CDS). In CDS the reset noise is simply measured and stored after each reset, then subtracted off the signal. However, it requires that each pixel be read twice per frame (which degrades the readout speed by a factor of two) and it requires a frame memory in which to store the reset values. For many applications these drawbacks render CDS impractical.

Another method is to use an active reset technique. Here feedback is used to measure the reset voltage during the reset and to dynamically compensate so that the read noise is eliminated. In this case an operational amplifier (opamp) is used to effect the feedback. The simplest active reset scheme uses an opamp per pixel 10, but there usually is not room in the size allotted a pixel for visible light imagers to accommodate a full op amp. Therefore this prior art technique is limited to line arrays or infrared imagers.

Figure 4:
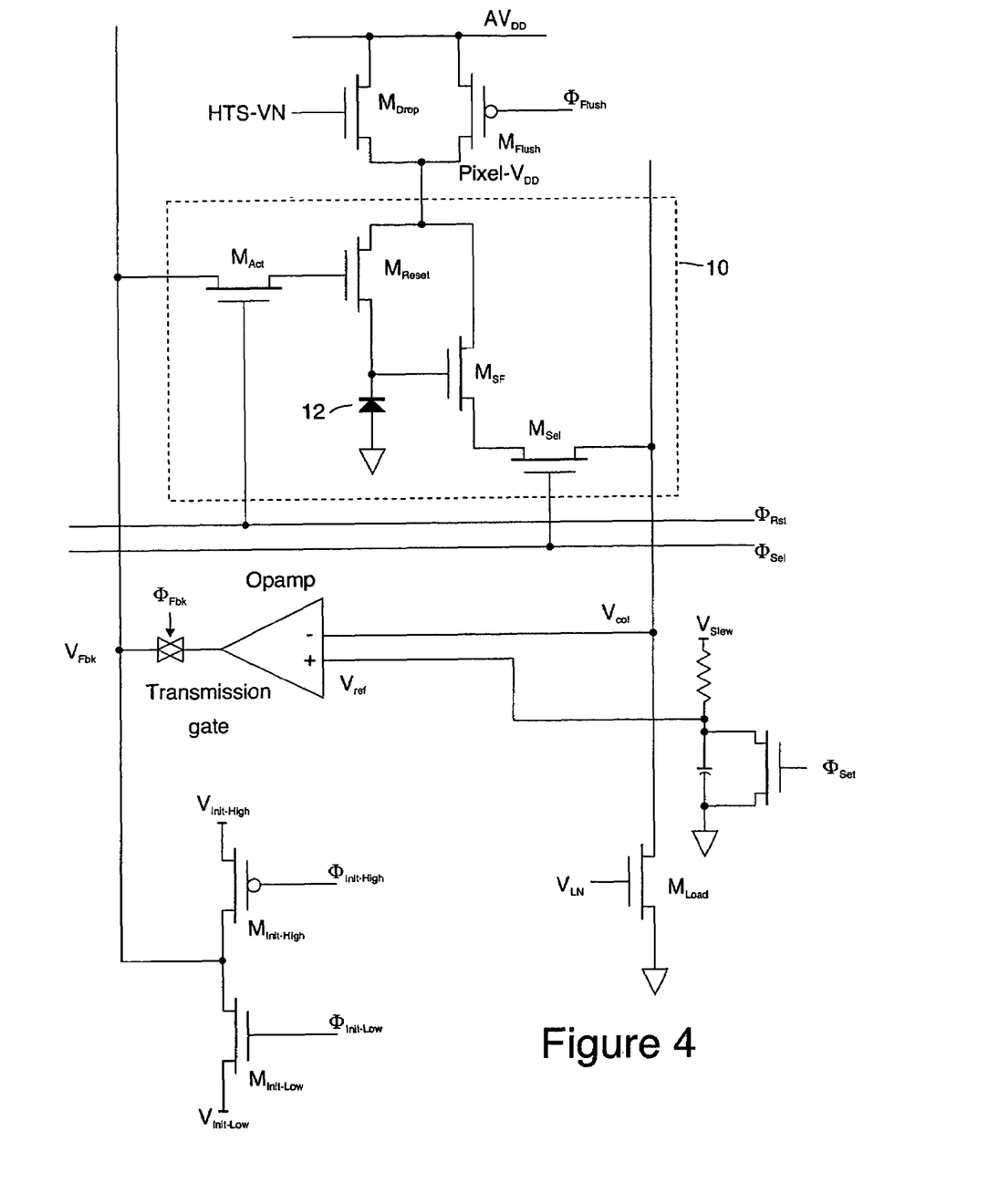
FIG. 4 is a schematic diagram of an active reset circuit for a photodiode, which circuit has dynamic range issues.

An active reset scheme that uses one opamp per column in shown in FIG. 4. This scheme adds one extra transistor in each pixel 10. The basic operation is that the opamp controls the reset of the photodiode by controlling the voltage on the gate of the reset transistor $M_{Reset}$. As the column voltage approaches the reference voltage, the opamp shuts off $M_{Reset}$. Because the shut-off of $M_{Reset}$ is controlled, the reset noise is reduced below the kTC limit.

The active reset scheme just described has the same (or a worse) problem as noted with reference to FIG. 1, namely, a limitation on the operating voltage range. Those skilled in the art appreciate that CMOS processes have some maximum voltage associated with the resulting devices. This voltage is usually denoted as $V_{DD}$, and its maximum value depends on the particular CMOS process used. Typical values for $V_{DD}$ are 3.3 V or 5.0 V for modern CMOS devices. Furthermore, for an n-channel transistor to be active, the gate voltage must be larger than the source voltage by a certain threshold voltage, called $V_T$. Threshold voltages are normally on the order of one volt, as previously mentioned.

Consider the example of a 5 volt CMOS process, that is, where $V_{DD}$=5.0 volts. Assume that $V_T$=1.0 volt. No voltage can be higher than $V_{DD}$ without risking reduce reliability, so the maximum value of the voltage on $\Phi_{Reset}$ is 5.0 V. This goes to the gate of $M_{Act}$. For $M_{Act}$ to be on then, its source must be at least one $V_T$ below the voltage on $\Phi_{Reset}$. Therefore the maximum value of $V_{Fbk}$ is around 4.0 volts. For $M_{Reset}$ to be on, its source must be at least another $V_T$ drop below this. Therefore the maximum voltage on the photodiode is around 3.0 V. Furthermore this is an absolute, maximum; one would like some headroom in which the opamp can operate. If we leave 0.5 V for this, it reduces the reset voltage further, to about 2.5 volts. There is yet one more threshold drop from the photodiode to the column bus voltage through $M_{SF}$. This means that the maximum column bus voltage is at most about 1.5 volts.

Since the column bus 14 can at most swing down to ground from its maximum voltage, this leaves the circuit with only 1.5 volts of swing according to this analysis. Furthermore, the actual situation is even somewhat worse than this simple analysis because of the so-called body effect which increases the threshold voltage beyond 1.0 V for transistors whose source and drain are near $V_{DD}$. In a real circuit therefore the available signal swing may be as small as 0.5 V out of the 5.0 V supply voltage.

Figure 5:
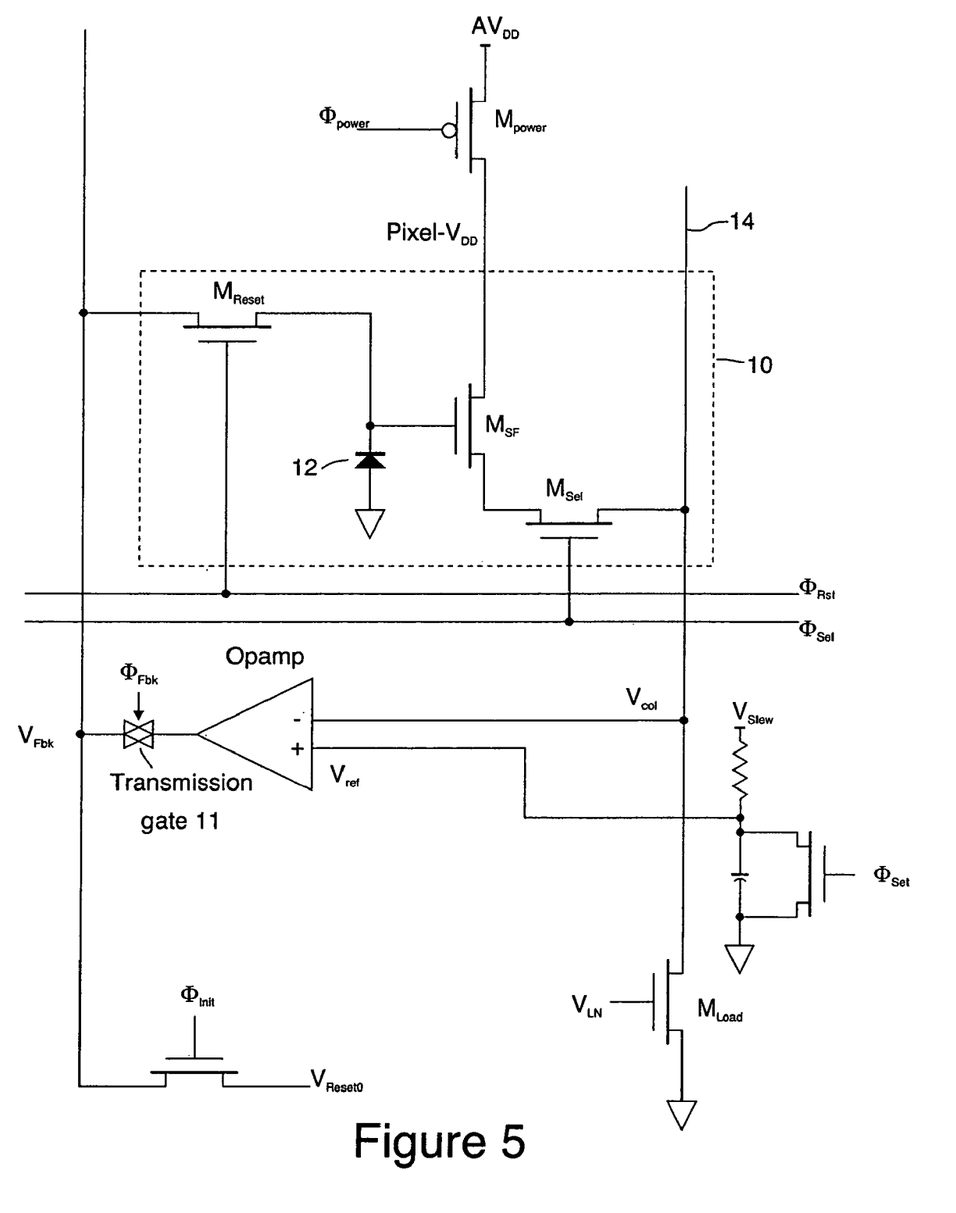
FIG. 5 is an improved version of an active reset circuit in which the dynamic range is improved.

One solution is to modify the details of the feedback system of FIG. 4 to the embodiment shown in FIG. 5. The opamp controls one side of the reset transistor $M_{Reset}$, and the activation transistor $M_{Act}$ is removed as it is no longer needed. So this proposed solution also simplifies the pixel 10 in that the number of transistors is reduced from four to three yet the pixel 10 of FIG. 5 still enjoys the improvement in reducing the reset noise below the kTC limit.

This scheme is intended to work similarly to the two step reset scheme disclosed with reference to the first embodiment of FIGS. 2 and 3. This so-called "kick-up" reset is used to obtain a higher reset voltage than ordinarily possible with an n-type reset transistor. Thus, $V_{Fbk}$ is initially disconnected from the opamp's output and is instead driven to an intermediate voltage $V_{Reset0}$ when $\Phi_{Init}$ is brought high turning on $M_{Init}$. $\Phi_{Rst}$ is then brought high, turning on $M_{Reset}$ as a switch and resetting the photodiode 12 to $V_{Reset0}$. $\Phi_{Rst}$ is then returned low, isolating $V_{Reset0}$ on the photodiode 12. This is all done with the $M_{Power}$ transistor off so that the source and drain of $M_{SF}$ are both at ground in stage one of the reset.

Then, in stage two of the reset, the $M_{Power}$ transistor is turned on, pulling up the source and drain of $M_{SF}$. As the voltage on the source and drain of $M_{SF}$ comes up, there is capacitive feed-through to the gate of $M_{SF}$ which increases the voltage on the photodiode 12. Since this capacitive feed-through is quite significant, the voltage on the photodiode can be kicked up to almost $V_{DD}$ by this technique.

The end result of this reset operation is that a voltage near $V_{DD}$ is stored on the photodiode 12. However, there has been no noise reduction yet; the photodiode reset voltage at this point in stage two still contains the full amount of kTC noise.

Therefore, at this point $V_{Fbk}$ is preferably isolated from external voltages, and the bilateral switch 11 is turned on so that $V_{Fbk}$ is driven by the output of the opamp; $\Phi_{Rst}$ is again brought high. The opamp lowers the end of transistor $M_{Reset}$ that is connected to $V_{Fbk}$, so that this end now acts as the source and the end connected to the photodiode 12 acts as the drain. When the voltage on the source of $M_{Reset}$ drops to around a threshold drop below the voltage on $\Phi_{Reset}$, transistor $M_{Reset}$ begins to turn on, drawing current out of the photodiode 12. Therefore current "backflows" out of the photodiode 12 during the active reset period, reducing the reset voltage somewhat and reducing noise at the same time.

The source-follower transistor $M_{SF}$ drives $V_{Col}$ on line 14 to follow the photodiode 12 voltage. When $V_{Col}$ approaches $V_{Ref}$, however, the opamp drives $V_{Fbk}$ back up, turning off $M_{Reset}$. In this way the reset voltage on the photodiode 12 is controlled by the opamp until $V_{Col} \approx V_{Ref}$. Because this reset is controlled, the kTC noise is eliminated.

The combined effect of the "kick up" reset together with this alternative active reset is as follows: The "kick up" reset using capacitive bootstrapping is used to get the photodiode 12 reset voltage to very near $V_{DD}$. This is as high as it should go without possibly damaging the pixel, and is a volt or so higher than can be achieved through other reset methods. However, this reset has the full kTC noise associated with it. The active reset then pulls the photodiode voltage back down slightly because current "backflows" out of the photodiode 12 during a third stage following the second stage.

Since one normally wants the reset voltage as high as possible, this action sacrifices some dynamic range, but in return gains a reduction in the reset noise. Overall, however, the final reset voltage in this "backflow" technique of FIG. 5 is still higher than can be achieved according to the technique described with reference to FIG. 4 because the backflow method does not suffer as much from the limitations imposed by the threshold voltage drops. And the "backflow" embodiment of FIG. 5 requires one fewer transistor per pixel 10 than does the technique of FIG. 4, another advantage over FIG. 4.

In summary, an alternative method has been described in this second embodiment for performing active reset in order to reduce the reset noise. The method of FIG. 4 uses an opamp driven circuit to set the photodiode reset voltage with reduced noise effects. However, the maximum reset voltage is limited by the several threshold voltage drops that the signal must suffer, and this severely limits the dynamic range of the imager pixel of FIG. 4.

The method and imager pixel circuit disclosed with reference to FIG. 5 uses a "kick-up" reset, also described with reference to the first embodiment, to initially reset the photodiode voltage all the way to near $V_{DD}$, although this reset is still noisy. The active reset is then engaged and causes a small amount of charge to "backflow" out of the photodiode 12. This actually reduces the reset voltage slightly, but in a controlled fashion so that the reset noise is considerably reduced.

The ultimate effect is to sacrifice a bit of the gain in dynamic range provided by the two stage reset technique in order to obtain a lower noise reset. It is thought that the addition of the third stage is an acceptable engineering tradeoff. Because the only a small amount of backflow is needed, because the kick-up reset can get the initial reset voltage so close to $V_{DD}$, and because this method does not work the same way with respect to the threshold voltage drops, the magnitude of the reset voltage and therefore the dynamic range is increased over that of the active reset method that only pulled the reset voltage up.

Of course those skilled in the art can now decide for themselves whether the two stage reset alone or the three stage reset (with noise reduction) better suits their needs.

Having described this invention in connection with several embodiments thereof, modification may well now suggest itself to those skilled in the art. As such the invention is not to be limited to the disclosed embodiments except as specifically required by the appended claims.

What is claimed is:

1. A multiple-step reset process for resetting a voltage stored on a photodiode prior to an integration time period, the process including:
   a first stage which occurs while a source and a drain of a pixel source-follower transistor are held at ground potential and including charging the photodiode and a gate of the pixel source-follower transistor to an initial reset voltage having potential less than that of a supply voltage; and
   a second stage which occurs after the initial reset voltage is stored on the photodiode and the gate of the pixel source-follower transistor and including releasing the source and drain voltages of the pixel source-follower transistor from ground potential and allowing the source and drain voltages of the pixel source-follower transistor to assume ordinary values above ground potential thereby resulting in a capacitive feed-through effect that increases the voltage on the photodiode to a value greater than the initial reset voltage.

2. The multiple-step process of claim 1 wherein during the first stage the source and the drain of the pixel source-follower transistor are held at ground potential by a transistor of opposite conductivity type to the conductivity type of the pixel source-follower transistor.

3. The multiple-step process of claim 2 wherein the drain of the pixel source-follower transistor is coupled to said supply voltage when said transistor of opposite conductivity type is in an ON state.

4. The multiple-step process of claim 1 further including a third stage wherein after increasing the voltage on the photodiode to a value greater than the initial reset voltage in the second stage, then draining the voltage on the photodiode in a controlled fashion to a value less than a highest value obtained therefore in order to reduce noise.

5. The multiple-step process of claim 4 wherein the step of draining voltage on the photodiode is accomplished using an operational amplifier having inputs connected to a column bus and to a reference voltage.

6. The multiple-step process of claim 5 wherein the operational amplifier continuously monitors the voltage on the column bus.

7. An imager circuit comprising:
   a plurality pixels, each pixel including:
      (i) a photodiode,
      (ii) a reset transistor for selectively coupling the photodiode to an initial reset voltage,
      (iii) a source-follower transistor having a gate coupled to the photodiode and having a first electrode coupled to a bus which is switchable between a ground potential and a supply voltage potential, and
   a kick up circuit for increasing the voltage stored on photodiodes in the plurality of pixels by switching the voltage on the bus.

8. The imager circuit of claim 7 wherein each pixel further includes:
   (iv) a selecting transistor for selectively coupling a second electrode of the source-follower transistor to a signal output bus.

9. The imager circuit of claim 8 wherein the plurality of pixels are arranged in a column and wherein said kick up circuit increases the voltage stored on photodiodes in each of the plurality of pixels in said column.

10. The imager circuit of claim 8 further including a monitoring circuit for monitoring the voltage stored on the photodiodes in each of the plurality of pixels in said column and an operational amplifier for draining the voltage on the photodiodes in said column in a controlled fashion to a value less than the increased value obtained therefore by the kick up circuit in order to reduce reset noise.

11. A method of resetting photodiodes disposed in an array of pixels, the method comprising:
   (i) arranging a photodiode in each pixel with three transistors in each pixel for controlling resetting of the photodiode, sensing by the photodiode and read out of a voltage stored on the photodiode after sensing;
   (ii) providing a column control circuit for switching a voltage on a column bus between first and second potentials;
   (iii) controlling the three transistors in each pixel to reset the photodiode in each pixel by raising the voltage stored on the photodiode in the pixel to an initial reset voltage, the initial reset voltage being less than a supply voltage; and
   (iv) capacitively coupling the voltage on the column bus via a capacitive feed-through effect associated with one of the transistors in the pixel such that in response to switching the voltage on the column bus the voltage on the photodiode in the pixel increases to a value greater than its initial reset voltage.

12. The method of claim 11 further including:
   (v) after capacitively coupling the voltage on the column bus to thereby increase the voltage on the photodiode to a value greater than the initial reset, draining the voltage on the photodiode in a controlled fashion to a value less than a highest value obtained therefore in order to reduce noise.

* * * * *